May 31, 1955   C. B. MARIETTA   2,709,532
LOAD SUPPORT AND PUSHER FOR INDUSTRIAL LIFT TRUCKS
Filed Sept. 6, 1950   7 Sheets-Sheet 6
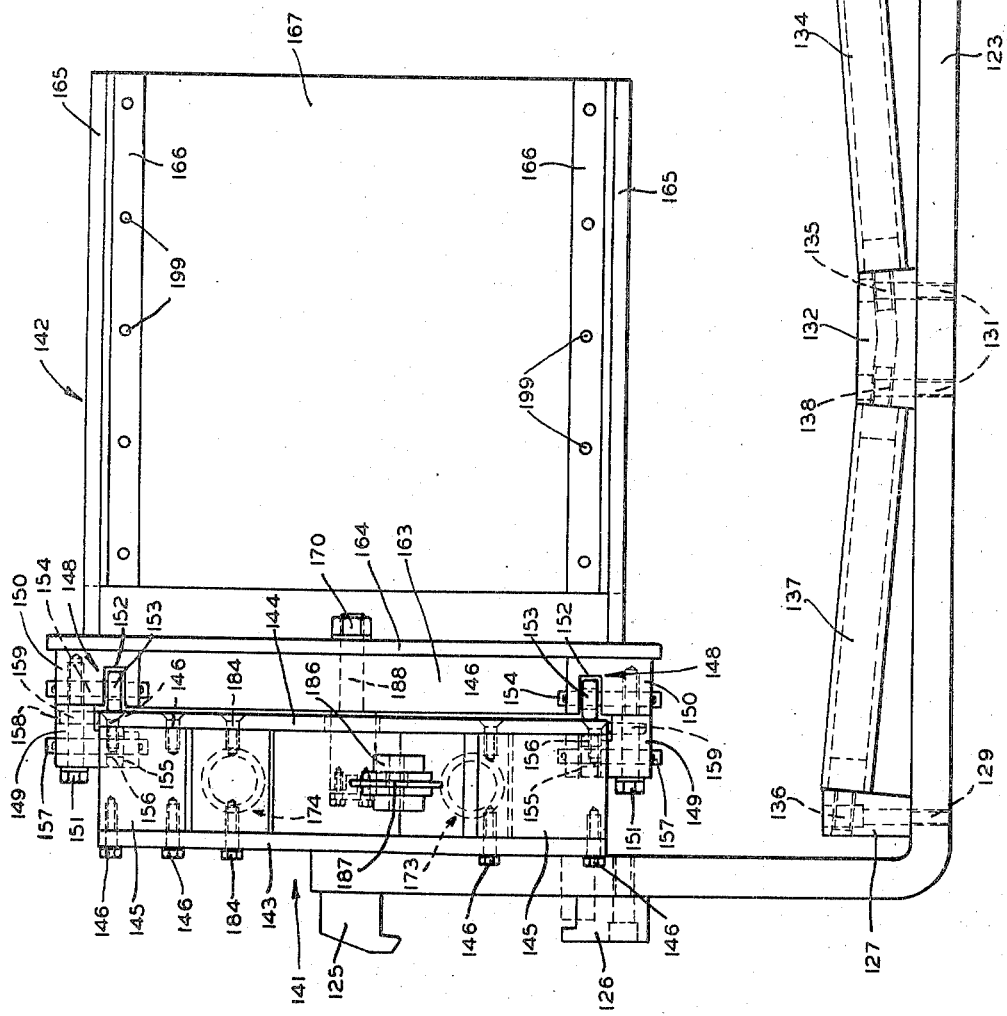
INVENTOR.
CARL B. MARIETTA
BY
ATTYS.

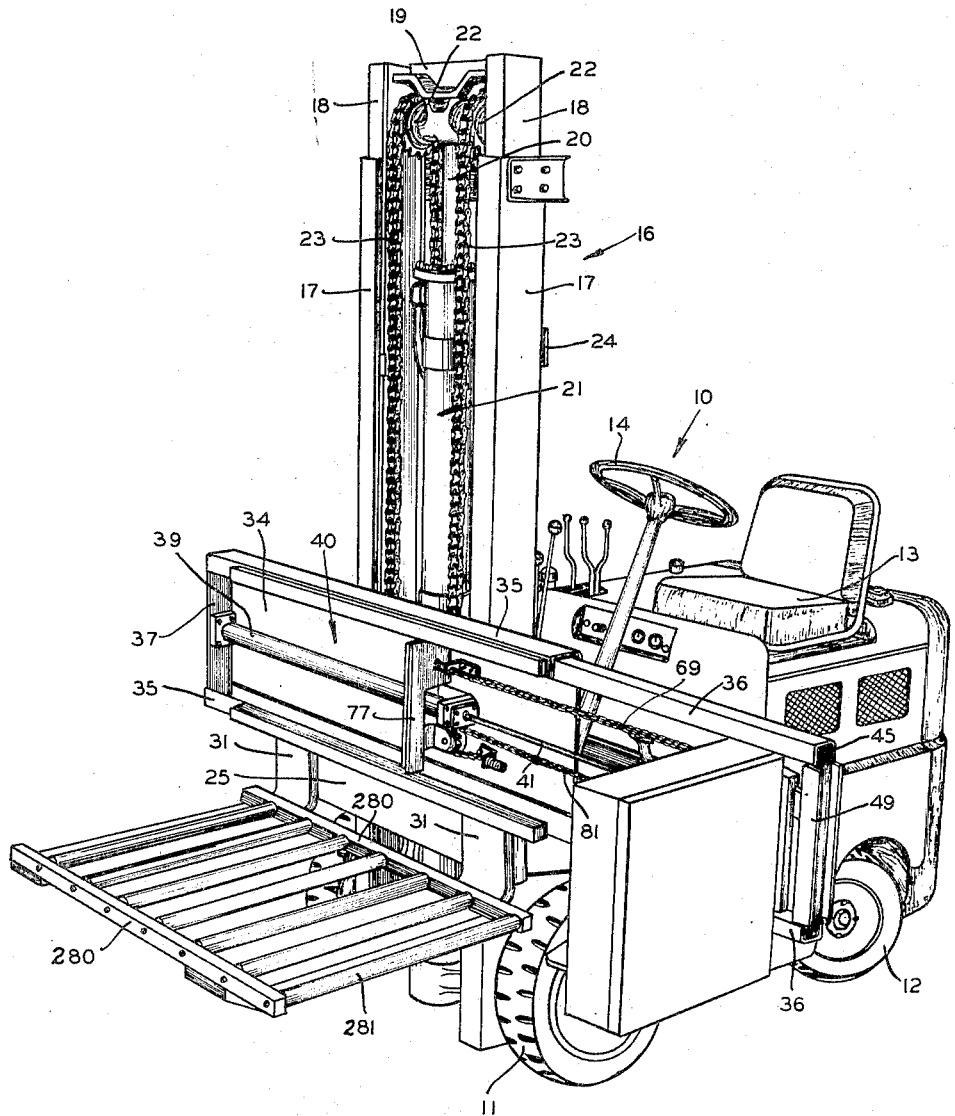

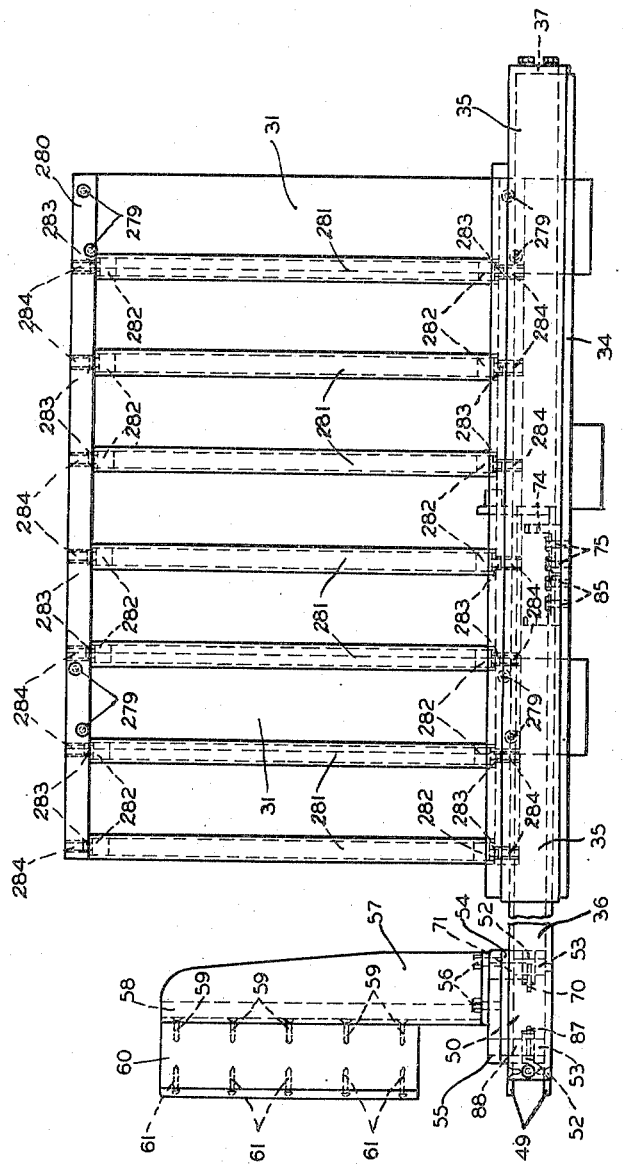

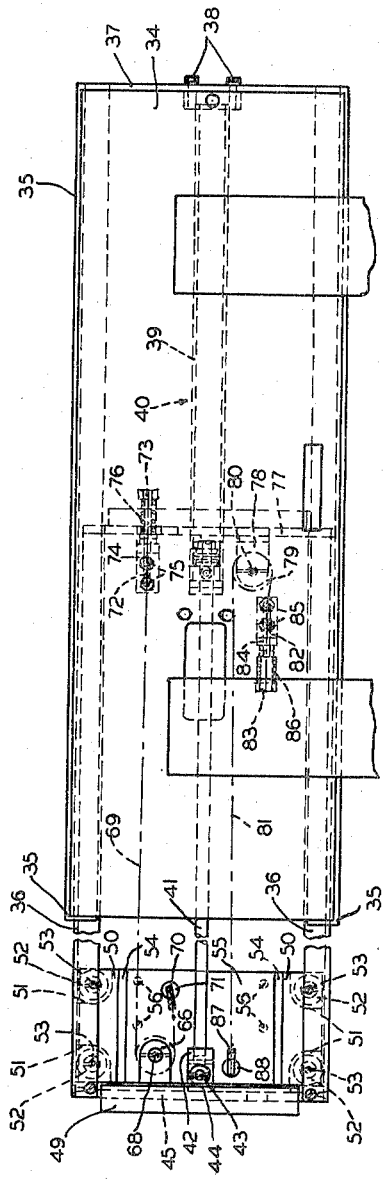

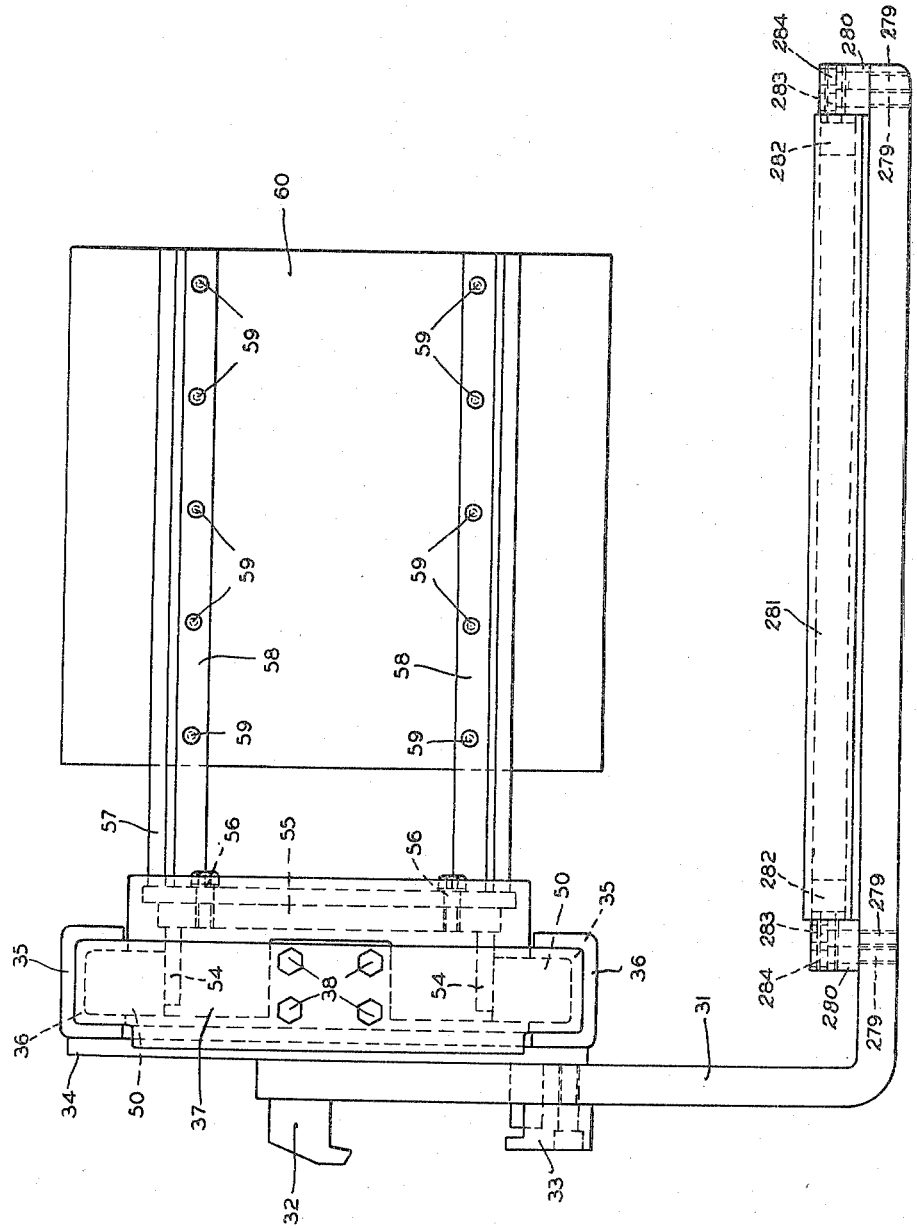

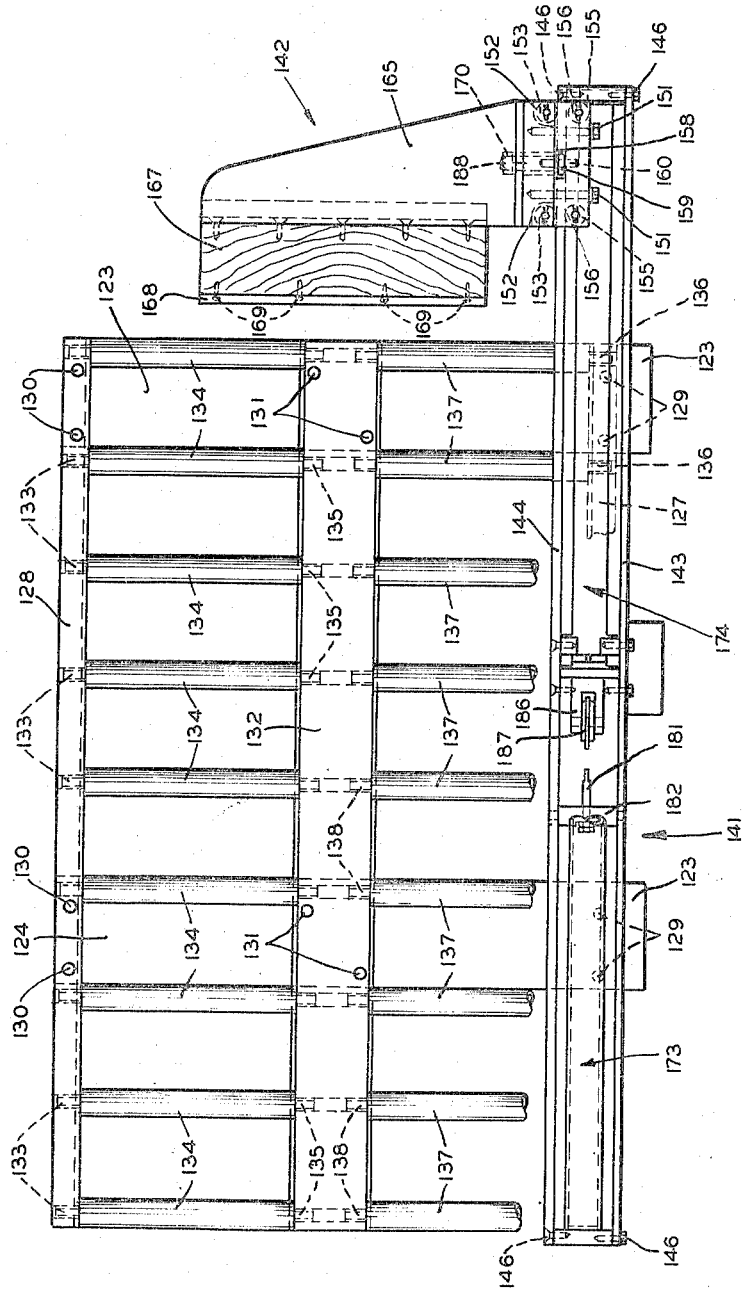

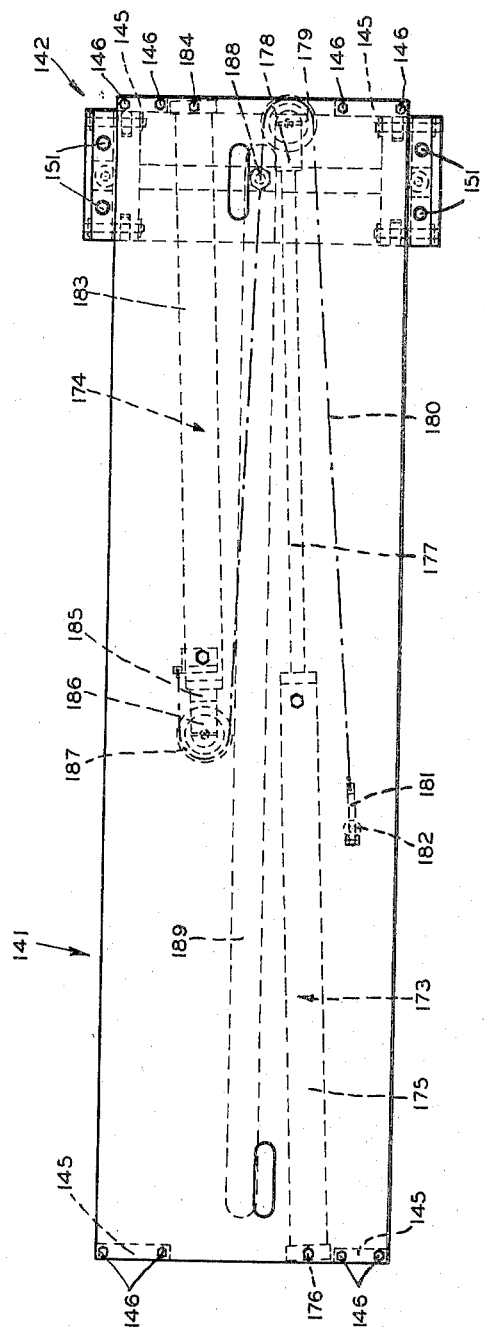

United States Patent Office 2,709,532
Patented May 31, 1955

2,709,532

LOAD SUPPORT AND PUSHER FOR INDUSTRIAL LIFT TRUCKS

Carl B. Marietta, Battle Creek, Mich., assignor to Clark Equipment Company, Buchanan, Mich., a corporation of Michigan Application September 6, 1950, Serial No. 183,374

16 Claims. (Cl. 214—514)

My invention relates generally to load supporting means for an industrial truck and, more specifically, is directed to a load supporting means and pusher mechanism for selectively discharging loads laterally from the load supporting means.

At the present time in the material handling field discharge of cartons or containers from the conventional load supporting means of an industrial truck, into open bins or racks which line an aisle, is effected manually by a worker standing on the load supporting means. Obviously, manual unloading is time consuming and extremely difficult in cases where the loads are heavy and bulky. Furthermore, there is the attended hazardous position assumed by the worker while balancing himself on the load supporting means and pushing the cartons or containers into the bins or racks.

It is an object of my present invention to provide a laterally movable pusher mechanism for discharging loads laterally from the load supporting means of an industrial truck.

In the preferred form of my present invention I contemplate the provision of a vertical plate member adapted to be mounted to the load supporting carriage of an industrial truck. Secured to the plate member, adjacent the upper and lower ends thereof, are a pair of first channel members in which are slidably mounted a second pair of channel members. A forwardly projecting pusher mechanism is slidably mounted in the second pair of channel members. Actuating means, preferably in the form of hydraulic piston and cylinder means, is secured to the plate member and is adapted, through suitable force transmitting means, as, for example, chain means, to effect movement of the second pair of channel members within the first pair of channel members and the pusher mechanism within the second pair of channel members.

In a modified form of my present invention for accomplishing the aforementioned object, I contemplate the provision of a box-like frame which is adapted to be mounted to the load supporting carriage of an industrial truck, transversely thereof. Mounted to the forward plate of the box-like frame, for movement therealong, is a pusher mechanism which is adapted to be actuated preferably by a pair of substantially horizontally opposed hydraulic piston and cylinder assemblies mounted within the box-like frame. Mounted to the outer ends of the piston rods of the hydraulic piston and cylinder assemblies are sprocket gears, over which are trained a chain secured at one end to the cylinder of one of the hydraulic piston and cylinder assemblies and at its other end to the plate members of the box-like frame. The chain, intermediate of its ends, is suitably mounted, by means of a bolt projecting through a horizontal slot formed in the forward plate of the box-like frame, to the pusher mechanism. When fluid under pressure is admitted to one of the hydraulic piston and cylinder assemblies, fluid is bled from the other hydraulic assembly, and the bolt and pusher mechanism carried by the chain are caused to move from one end of the box-like frame to the other. Movement of the bolt and pusher in the opposite direction is effected by bleeding the fluid from the one hydraulic assembly and admitting fluid under pressure to the other hydraulic assembly.

It is another object of my present invention to provide a load supporting means particularly adapted for discharging loads laterally therefrom.

I propose to accomplish this object by providing a conveyor comprising a plurality of horizontally spaced rotatable rolls, which conveyor is adapted to be mounted to the load supporting carriage of an industrial truck, transversely thereof, below the pusher mechanism.

It is a further object of my present invention to provide a conveyor, of the character described, from which loads may be discharged substantially in a straight line.

I propose to accomplish the above object by providing a conveyor having a plurality of pairs of conveyor rolls disposed in horizontal spaced apart relation, with the rolls of each pair lying in substantially end to end relationship, and in which the lengthwise axes of the rolls of each pair are inclined downwardly toward each other. The arrangement noted thus defines a conveyor of substantially V-shape, so that loads may be discharged therefrom in substantially a straight line.

It is a still further object of my invention to provide a load supporting means and pusher mechanism, of the character described, which may be incorporated with existing conventional industrial trucks without requiring modification of the latter.

I propose to accomplish this object by mounting the conveyor and pusher mechanism to a pair of conventional L-shaped load supporting fork frames which are adapted to be detachably mounted to the load supporting carriage of an industrial truck. It will, thus, be observed that the load supporting means and pusher mechanism of my present invention may be easily detached from a load supporting carriage in order that other devices may be incorporated therewith.

Now, in order to acquaint those skilled in the art with the manner of constructing and using the devices of my present invention, I shall describe, in connection with the accompanying drawings, certain preferred embodiments of my invention.

In the drawings:

Figure 1 is a perspective view of an industrial truck to which is secured, at the forward end thereof, the preferred form of load supporting means and pusher mechanism of my present invention;

Figure 2 is a plan view of the load supporting means and pusher mechanism of Figure 1;

Figure 3 is a rear elevational view of the pusher mechanism of Figure 2;

Figure 4 is a side elevational view of the load supporting means and pusher mechanism of Figure 2;

Figure 5 is a plan view of a modified form of load supporting means and pusher mechanism of my present invention;

Figure 6 is a side elevational view of the load supporting means and pusher mechanism of Figure 5; and Figure 7 is a rear elevational view of the pusher mechanism of Figure 5.

Referring now to Figure 1, there is shown an industrial truck, indicated generally by the reference numeral 10, having a pair of drive wheels 11 disposed at the forward end thereof, and a pair of steering wheels 12 disposed at the rear end thereof. The truck 10 is provided with a conventional prime mover and drive means for effecting driving of the forward wheels 11. Mounted on the truck 10 is an operator's seat 13, and disposed forwardly thereof is a hand steering wheel 14 mounted on a steering column 15 which has connection in a conventional manner to the rear steering wheels 12. Mounted adjacent the forward end of the truck 10 is a conventional vertically extending mast, indicated generally by the reference numeral 16, which comprises a pair of opposed facing vertically extending channel members 17, in which are slidably mounted a pair of vertically extending opposed facing channel members 18. The slidable channel members 18, adjacent their upper ends, are interconnected by means of a crosshead 19, which has suitable connection to the outer end of a piston rod 20 of a hydraulic piston and cylinder assembly, indicated generally by the reference numeral 21. The assembly 21 is secured, at its lower end, to the frame of the industrial truck 10. Rotatably mounted on the crosshead 19, about a horizontal axis, are a pair of sprocket gears 22 over which a pair of chains 23 are trained. The chains 23, adjacent their one ends, have connection to a brace member 24 secured to the outer fixed channel members 17, intermediate of the ends thereof. The chains 23, adjacent their other ends, are suitably connected to a load supporting carriage which is mounted for vertical movement within the inner channel members 18. Secured to the load supporting carriage are a pair of vertically spaced transversely extending frame members 25, of which only the lower one is shown in Figure 1.

The transversely extending frame members 25 are adapted to support a pair of horizontally spaced L-shaped fork frames 31. As best shown in Figure 4, downwardly facing hook-shaped members 32 are secured to each of the fork frames 31, adjacent the upper end thereof, and are adapted to be disposed over the upper edge of the upper transverse frame member 25. Upwardly facing hook-shaped members 33 are secured to each of the fork frames 31, intermediate of the ends of the vertical legs thereof, and are adapted to be disposed about the lower edge of the upper transverse frame member 25 for securing the fork frames 31 thereto. The lower portions of the vertical legs of the fork frames 31 are adapted to bear against the lower transverse frame member 25. From the above description it will be realized that the L-shaped fork frames 31 are adapted to be easily removed from the transverse frame members 25 in order that other devices may be incorporated with the industrial truck 10.

A transversely extending plate member 34 is secured to the forward surfaces of the vertical legs of the fork frames 31, adjacent the upper end thereof. The plate member 34 is adapted to support the pusher mechanism of my present invention. Secured to the forward surface of plate member 34, adjacent the upper and lower ends thereof, are a pair of opposed facing channel members 35, in which are slidably mounted a pair of channel members 36. Suitably secured, as by welding, to the one ends of the outer fixed channel members 35 is a vertical brace member 37, to which is mounted, as by a plurality of bolts 38, the closed end of a cylinder 39 of a transversely extending hydraulic piston and cylinder assembly, indicated generally by the reference numeral 40, disposed closely adjacent the plate member 34, within the confines of the channel members 35. The outer end of the piston rod 41 of the hydraulic piston and cylinder assembly 40 is provided with a yoke member 42 which is pivotally mounted by a pin member 43 to a flange 44, carried by a vertically extending brace member 45, preferably bolted to the inner slidable channel members 36, adjacent one end thereof, as best shown in Figure 3. A pair of bearing plates 49 are secured to the edges of brace member 45.

From the foregoing description it will be seen that actuation of the hydraulic piston and cylinder assembly 40 is adapted to effect transverse movement of the inner channel members 36, within the outer fixed channel members 35.

Disposed for movement within the inner channel members 36 are a pair of block members 50 which have recesses 51 formed therein. Disposed in each of the recesses 51 is a vertically extending roller member 52, journaled on a horizontal pin member 53, fixed at its ends within the block members 50. The outer periphery of the roller members 52 is adapted to engage the bight portions of the channel members 36 for guiding the block members 50 in movement therealong. The block members 50 have secured to their facing sides bar members 54 which are interconnected by a vertically extending plate member 55. Mounted to the forward face of the plate member 55, by means of a plurality of bolts 56, is the vertically extending bight portion of a forwardly extending U-shaped frame member 57. Secured, as by welding, along the edges of the forwardly projecting legs of the U-shaped frame member 57 are channel members 58, to which is secured, as by a plurality of screws 59, a vertical pusher block 60, preferably formed of wood. Secured to the outer face of the pusher block 60, by a plurality of screws 61, is a facing material. The pusher block 60, U-shaped frame member 57, and block members 50 are adapted to be moved, as a unit, transversely of the industrial truck, within the inner U-shaped channel members 36.

A pair of horizontally spaced bracket members 66 are secured to the inner face of the aforedescribed brace member 45, secured to the one ends of the inner channel members 36. Disposed between the bracket members 66 is a sprocket gear member 67, rotatably journaled on a shaft 68, secured at its ends within the bracket members 66. A chain 69 is trained over the sprocket gear member 67 and is fixed, at its one end, to a pin member 70 secured to the outer end of a post member 71, which, in turn, is secured at its other end to the web or plate member 55 interconnecting the block members 50. The chain 69, at its other end, is fixed to one end of a bolt 72. The bolt 72 is adapted to extend through an opening formed in one leg of a bracket member 74, suitably secured, as by bolts 75, to the transverse vertical plate member 34. A coil spring 76 is disposed about the bolt 72 between the leg of the bracket 74 and the bolt head 73 of bolt 72 for taking up the slack in the chain 69.

Interconnecting the opposite ends of the inner channel members 36, from those interconnected by brace member 45, is a brace member 77. A central opening is formed in the plate member 77 in order that it may be disposed about the hydraulic piston and cylinder assembly 40. A suitable opening is also formed in the plate member 77 for receiving the bolt head 73 of bolt 72 when the pusher mechanism is in the position shown in Figure 1. Mounted to one face of the plate member 77 are a pair of horizontally spaced bracket members 78, between which is disposed a sprocket gear member 79. The sprocket gear member 79 is journaled on a shaft 80 mounted, at its ends, within the bracket members 78. A chain 81 is trained over the sprocket gear member 79 and is fixed, at its one end, to a bolt 82. The bolt 82 is adapted to extend through an opening formed in the one leg of a bracket member 84, secured, as by bolts 85, to the transverse vertical plate member 34. Disposed about the bolt 82, between the leg of the bracket member 84 and the bolt head 83 of bolt 82, is a spring 86 for taking up the slack in the chain 81. The chain 81, at its opposite end, is pivotally mounted to a pin member 87 which is secured to the outer end of a post member 88, secured to the web or plate member 55 interconnecting the block members 50, which carry the pusher block 60.

When the operator of the industrial truck 10 selectively admits fluid under pressure to the closed end of the cylinder 39 of the hydraulic piston and cylinder assembly 40, the piston rod 41 is extended and the pusher block 60 is moved to the position shown in Figures 1 and 3. When the fluid is bled from the closed end of the cylinder 39 and fluid is admitted to the opposite end, the piston rod 41 is retracted. Retraction of the piston rod 41 urges the brace member 45, which interconnects the one ends of the inner channel members 36, to move to the right, as viewed in Figure 3. Simultaneously, the plate member 77, interconnecting the opposite ends of the inner channel members 36, is moved to the right, thereby causing the bracket members 78, together with sprocket gear member 79, to move to the right. Movement of the sprocket member 79 to the right causes clockwise rotation thereof, since the chain 81 is fixed to the transverse vertical plate member 34. Clockwise rotation of the sprocket gear member 79 causes the upper portion of chain 81 to move to the right, thereby urging the web portion 55, interconnecting the block members 50, to move to the right and to carry the pusher block 60 to the right also. When the piston rod 41 is in its fully retracted position, the pusher block 60 is disposed in a position adjacent the opposite end of the outer channel members 35 from the position shown in Figure 1.

When it is desired to return the pusher block 60 to the position shown in Figures 1 and 3, fluid under pressure is selectively admitted to the closed end of the cylinder 39 of the hydraulic piston and cylinder assembly 40, thereby causing the piston rod 41 to be extended. When the piston rod 41 is extended, the inner channel members 36 are urged to the left, as viewed in Figure 3, which causes the spaced bracket members 66, secured to plate member 45, interconnecting the one ends of the inner channel members 36, to move to the left also. Movement of the bracket members 66 to the left causes the sprocket gear member 67 to rotate clockwise, since the chain 69 is fixed at one end to the plate member 34. Clockwise rotation of sprocket gear member 67 causes the lower portion of the chain 69 to move to the left, thereby causing the web portion 55, together with block members 50 and pusher block 60 to move to the left. When the piston rod 41 is in its fully extended position, the pusher block 60 assumes the position shown in Figures 1 and 3.

I shall now describe the preferred form of load supporting means particularly adapted for use with the aforedescribed pusher mechanism of my present invention.

Secured, by bolts 279, to the horizontal legs of the fork frames 31 are a pair of horizontally spaced support members 280 which extend transversely of the industrial truck 10. Extending lengthwise of the truck are a plurality of spaced hollow roll members 281 which, at their ends, are provided with plug members 282 having reduced end portions 283 journaled in openings 284 formed in the aforementioned support members 280.

From the foregoing description it will be understood that after goods have been stacked upon the load supporting rolls the truck 10 may be driven to the space in which the goods are to be deposited. After the truck 10 has been properly aligned at right angles to this space, the operator of the truck need only manipulate the suitable control lever to actuate the hydraulic piston and cylinder assembly 40 so as to cause the pusher block 60 to move transversely of the truck. The load is then discharged laterally from the load supporting rolls. While the pusher mechanism of my present invention is preferably adapted to discharge a load to the left of the operator of the truck, it will be understood that a load may be discharged also to the right of the operator.

Referring now to Figures 5, 6, and 7, I shall describe in connection therewith a modified form of pusher mechanism and load supporting means of my present invention. There is shown a pair of bearing support members at 127 and 128 which extend transversely of the industrial truck 10 and are secured, respectively, to the inner and outer ends of the horizontal legs of the fork frames 123 and 124, by means of a plurality of bolts 129 and 130. Secured to the horizontally extending legs of the forks 123 and 124, as by means of a plurality of bolts 131, intermediate of the bearing support members 127 and 128, is a transversely extending bearing support member 132.

Journaled in horizontally spaced openings formed in the bearing support member 128 are the reduced end portions 133 of a plurality of rolls 134, which have reduced end portions 135 journaled in horizontally spaced openings formed in one side of the intermediate bearing support member 132. Journaled in horizontally spaced openings formed in the transverse bearing support member 127 are the reduced end portions 136 of a plurality of rolls 137 which, at their other ends, have reduced end portions 138 suitably journaled in horizontally spaced openings formed in the adjacent side portion of the intermediate bearing support member 132. The plurality of rolls 134 and 137 extend lengthwise of the truck 10 and are laterally spread the entire width of the truck 10.

As shown in Figure 6, the lengthwise axes of the rolls 134 and 137 are inclined downwardly toward the intermediate bearing support member 132. This concave arrangement of the rolls 135 and 137 is provided in order that cartons supported thereon will be discharged in a straight line extending transversely of the truck 10, when the cartons are pushed off of the rolls 134 and 137. The rolls 134 and 137 and the bearing support members 127 and 128 define a substantially V-shaped conveyor.

Extending transversely of the truck 10 and suitably secured to the vertically extending leg portions of the fork members 123 and 124, adjacent the upper end thereof, is a box-like frame construction, indicated generally by the reference numeral 141, which supports a transversely movable pusher mechanism, indicated generally by the reference numeral 142. The frame construction 141 comprises a pair of vertical horizontally spaced apart plate members 143 and 144 which, at their four corners are held in spaced relation by means of spacer members 145. The spacer members 145 are held to the plate members 143 and 144 by means of a plurality of bolts 146.

Disposed about the upper and lower edges of the forward plate member 144 are a pair of substantially inverted U-shaped frame members 148 which are formed by blocked members 149 and 150, held together by means of a plurality of bolts 151. Formed in each of the block members 150, adjacent each end thereof, are horizontally extending cutouts 152. Disposed within the cutouts 152 are rollers 153 which, at their outer periphery, are adapted to engage the forward surface of the plate member 144. The rollers 153 are each journaled on a vertically extending shaft 154 mounted within the block members 150.

Formed in each of the block members 149, at each end thereof, are horizontally extending cutouts 155 which are adapted to receive rollers 156. The rollers 156 are journaled on vertically extending shafts 157 carried by the block members 149, and the rollers 156, at the outer periphery thereof, are adapted to engage the rear surface of the forward plate member 144.

A vertically extending opening 158 is formed in each of the block members 149 and is adapted to be vertically aligned with the forward plate member 144. Disposed within the openings 158 are rollers 159, journaled on horizontal shafts 160, which are mounted at their one ends in the block member 149 and at their other ends in the block members 150. The rollers 159, at their outer peripheries, are adapted to engage the upper and lower edges of the forward plate member 144.

The block members 150 are interconnected by means of a web portion 163 which lies forwardly of the plate member 144. Secured to the forward surface of the block members 150 and the outer edge of the web portion 163 is a vertically extending flange 164 to which is secured, at the upper and lower edges thereof, a pair of vertically spaced forwardly projecting arm members 165. Secured along the inwardly facing surfaces of each of the arm members 165 are angle flange members 166. Mounted to the angle flange members 166, adjacent one side thereof, by screws 199, is a vertical forwardly projecting block member 167 which, for purposes of illustration, is formed of wood. A load engaging plate 168 is secured to the outer face of the wooden block member 167, by means of a plurality of wood screws 169.

The arm members 165 and the wooden block member 167 are adapted to traverse the inclined roller load supporting means for discharging a load therefrom. Transverse movement of the arms 165 and the wooden block member 167 is guided by means of the aforedescribed horizontally extending rollers 153 and 156 which engage the forward and rear surfaces, respectively, of the forward plate member 144, and by the vertically extending roller members 159 which engage the upper and lower edges of the plate member 144. These rollers prevent the pusher mechanism 142 from binding when it is moved along the plate member 144.

Transverse movement of the pusher 142 is effected by means of a pair of opposed hydraulic piston and cylinder assemblies 173 and 174, which are disposed between the plate members 143 and 144 of the pusher frame 141. The hydraulic piston and cylinder assembly 173 comprises a cylinder 175 which, at its closed end, is pivotally secured between the plate members 143 and 144, as at 176. Disposed within the cylinder 175, for reciprocatory motion therein, is a piston rod 177 which, at its outer end, has secured a yoke member 178. Between the leg members of the yoke 178 is rotatably mounted a sprocket gear 179 over which is trained a chain 180 having connection at its one end to an adjusting screw 181 anchored to a brace member 182, secured at its ends to the plate members 143 and 144.

The hydraulic piston and cylinder assembly 174 comprises a cylinder 183 which, at its closed end, is pivotally mounted, as at 184, between the plate members 143 and 144. Disposed within the cylinder 183, for reciprocatory motion, is a piston rod 185 which has secured at its outer end a yoke member 186. Rotatably mounted between the legs of the yoke member 186 is a sprocket gear 187 over which is trained the aforedescribed chain 180. The chain 180, at its other end, is anchored to the outer end of the cylinder 183 of the hydraulic piston and cylinder assembly 174.

Fixedly mounted to the chain 180, intermediate of the ends thereof, is a bolt 188 which extends forwardly through a horizontal groove 189 formed in the forward plate member 144. The bolt 188, at its outer end, is disposed through the web portion 163 interconnecting the block members 150 and is secured, as by a nut 170, to the flange portion 164, to which the forwardly extending arms 165 of the pusher 142 are secured. It will thus be observed that movement of the chain 180 will cause movement of the bolt 188 which, since it is secured to the pusher 142, will cause movement thereof.

As shown in Figure 7, the pusher 142 is disposed at the right side of the pusher supporting frame 141 when the piston rod 177 of the hydraulic piston and cylinder assembly 173 is extended and the piston rod 185 of the hydraulic piston and cylinder assembly 174 is retracted. Now, when fluid under pressure is admitted through suitable hose lines (not shown) to the closed end of the cylinder 183 of the hydraulic piston and cylinder assembly 174, and fluid is bled from the cylinder 175 of the hydraulic piston and cylinder assembly 173, the piston rod 185 is forced outwardly, thereby causing the chain 180 and the bolt 188, secured intermediate of the ends thereof, to move to the right. When the piston rod 185 is fully extended and the piston rod 177 fully retracted, the bolt 188 will be disposed at the left side of the pusher frame 141. Movement of the bolt 188 to the left side of the pusher frame 141 causes the pusher 142 to be disposed also to the left end thereof.

The pusher 142 may be returned to the right side of the pusher frame 141 by admitting fluid under pressure to the cylinder 175 of the hydraulic piston and cylinder assembly unit 173, and by simultaneously bleeding the fluid from the cylinder 183 of the hydraulic piston and cylinder assembly 174. Admission of fluid to the cylinder 175 causes the piston rod 177 to be extended, which thus moves the chain 180, together with the bolt 188, to the right. It will thus be observed that by the selective admission of fluid under pressure to either of the cylinders 175 or 183 of the hydraulic piston and cylinder assemblies 173 or 174, the pusher 142 may be disposed at either the right or the left side of the pusher frame 141 or at any intermediate position that may be desired.

With the pusher 142 disposed at the right side of the pusher frame 141, as shown in Figures 5 and 7, goods may be stacked upon the rolls 134 and 137 of the load supporting means of my present invention. The industrial truck 10 may then be driven to the space in which the goods are to be deposited. After the truck 10 has been properly aligned at right angles to this space, the goods may be discharged laterally by admitting fluid under pressure to the closed end of the cylinder 183 of the hydraulic piston and cylinder assembly 174, thereby causing the pusher 142 to move to the left. After the load has been discharged, the pusher 142 may be returned to its normal position, adjacent the right side of the pusher frame 141 as aforedescribed. Although the modified form of pusher mechanism of my present invention is preferably adapted to discharge a load to the left of the operator of the truck, it will be realized that a load may be discharged also to the right of the operator.

While I have shown and described what I believe to be certain preferred embodiments of my present invention, it will be understood that various modifications and rearrangements may be made therein without departing from the spirit and scope of my present invention.

I claim:

1. For use with an industrial truck having a mast and a load supporting carriage movable therealong, load supporting means comprising, a plurality of L-shaped frame members adapted to be mounted to the load supporting carriage, horizontally spaced transverse support members secured to said L-shaped frame members, a plurality of pairs of horizontally spaced rotatable rolls, the lengthwise axis of each pair of rolls being inclined downwardly toward each other, and said rotatable rolls being journaled at their ends in said transverse support members.

2. For use with an industrial truck having a mast and a load supporting carriage movable therealong, a vertical plate member adapted to be mounted to the load supporting carriage transversely thereof, and a vertical forwardly projecting pusher mechanism journaled along its rear vertical edge on the upper and lower edges of said vertical plate member for movement therealong between two termini one at each side of the load supporting carriage beyond the extremity thereof.

3. For use with an industrial truck having a mast and a vertical load supporting carriage movable therealong, a box-like frame comprising a pair of horizontally spaced vertical plate members, the one plate member being adapted to be mounted to the load supporting carriage transversely thereof, and a vertical forwardly projecting pusher mechanism disposed forwardly of both of said vertical plate members journaled along its rear vertical edge on the upper and lower edges of the other vertical plate member for movement therealong between two termini one at each side of the load supporting carriage beyond the extremity thereof.

4. The industrial truck of claim 3 characterized by the provision of means for effecting movement of said pusher mechanism transversely of the industrial truck.

5. The industrial truck of claim 4 wherein said means comprises a pair of opposed hydraulic piston and cylinder assemblies mounted between said pair of vertical plate members, and chain means between said assemblies and said pusher mechanism.

6. The industrial truck of claim 3 characterized by the provision of a pair of opposed hydraulic piston and cylinder assemblies each having a piston rod, said hydraulic piston and cylinder assemblies being mounted between said pair of vertical plate members, gear sprockets mounted to the ends of said piston rods, a chain anchored at its ends and trained over said sprockets, and a mounting means between the intermediate portion of said chain and said pusher mechanism whereby when the one piston rod is extended and the other piston rod retracted the pusher mechanism is moved to one end of said other vertical plate member and when the other piston rod is extended and the one piston rod retracted the pusher mechanism is moved to the other end of said other vertical plate member.

7. The industrial truck of claim 6 wherein said mounting means comprises a bolt projecting through a horizontal slot in said other plate member.

8. For use with an industrial truck having a mast and a load supporting carriage movable therealong, the combination of frame means mounted to the load supporting carriage, substantially V-shaped conveyor means extending transversely of the industrial truck and mounted to said frame means, a vertical plate member secured to said frame means transversely of the industrial truck, a forwardly projecting vertical pusher mechanism mounted along its rear vertical edge on said vertical plate member for movement therealong between two termini one at each side of the load supporting carriage beyond the extremity thereof, and means for effecting movement of said pusher mechanism.

9. For use with an industrial truck having a mast and a load supporting carriage movable therealong, the combination of a plurality of L-shaped frame members adapted to be mounted to the load supporting carriage, horizontally spaced transverse support members secured to said L-shaped frame members, a plurality of pairs of horizontally spaced rotatable rolls, the lengthwise axis of each pair of rolls being inclined downwardly toward each other, said rotatable rolls being journaled at their ends in said transverse support members, a transverse box-like frame comprising a pair of horizontally spaced vertical plate members, the one plate member being secured to said L-shaped frame members, a forwardly projecting vertical pusher mechanism journaled along its rear vertical edge on the upper and lower edges of the other vertical plate member for movement therealong between two termini one at each side of the load supporting carriage beyond the extremity thereof, and means carried by said plate members for effecting movement of said pusher mechanism.

10. For use with an industrial truck having a mast and a load supporting carriage movable therealong, a first pair of vertically spaced channel members adapted to be secured to said load supporting carriage, a second pair of channel members slidably mounted in said first pair of channel members, a forwardly projecting pusher mechanism slidably mounted at its rear vertical edge in said second pair of channel members, and means carried by said load supporting carriage for effecting movement of said second pair of channel members within said first pair of channel members and said pusher mechanism within said second pair of channel members between two termini one at each side of the load supporting carriage beyond the extremity thereof.

11. For use with an industrial truck having a mast and a load supporting carriage movable therealong, a vertical plate member adapted to be mounted to said load supporting carriage transversely of said industrial truck, first channel members being secured to said plate member adjacent the upper and lower edges thereof, second channel members slidably mounted in said first channel members, a forwardly projecting pusher mechanism slidably mounted at its rear vertical edge in said second channel members, and means carried by said plate member for effecting movement of said second channel members within said first channel members and said pusher mechanism within said second channel members between two termini one at each side of the load supporting carriage beyond the extremity thereof.

12. For use with an industrial truck having a mast and a load supporting carriage movable therealong, a vertical plate member adapted to be mounted to said load supporting carriage transversely of said industrial truck, first channel members being secured to said plate member adjacent the upper and lower edges thereof, second channel members slidably mounted in said first channel members, a forwardly projecting pusher mechanism slidably mounted in said second channel members, gear sprockets carried by said second channel members adjacent the ends thereof, chains trained over said gear sprockets, said chains at one end being mounted to said plate member and at the other end being mounted to said pusher mechanism, and means for effecting movement of said second channel members within said first channel members.

13. The combination of claim 10 wherein a plurality of horizontal rolls are mounted to said load supporting carriage below said pusher mechanism.

14. For use with an industrial truck having a mast and a load supporting carriage movable therealong, a plurality of forwardly projecting L-shaped fork frames adapted to be mounted to said load supporting carriage, a vertical plate member mounted to the vertical legs of said L-shaped fork frames, first channel members being secured to said plate member adjacent the upper and lower edges thereof, second channel members slidably mounted in said first channel members, a forwardly projecting pusher mechanism slidably mounted in said second channel members, means carried by said plate member for effecting movement of said second channel members within said first channel members and said pusher mechanism within said second channel members, and horizontal conveyor means mounted to the horizontal legs of said L-shaped fork frames below said pusher mechanism.

15. For use with an industrial truck having a mast and a load supporting carriage movable therealong, the combination of a substantially horizontal load supporting frame secured to and extending forwardly from the load supporting carriage, a plurality of horizontally spaced rotatable rolls journaled in said load supporting frame for supporting a load thereon, the axes of said rotatable rolls extending parallel to the longitudinal axis of the industrial truck, a vertical forwardly projecting pusher member overlying said rolls, means carried by said load supporting carriage for guiding the rear vertical edge of said pusher member during movement over said rolls transversely of the industrial truck between two termini one at each side of the load supporting carriage beyond the extremity thereof, power actuated means for effecting movement of said pusher member whereby a load supported on said rolls may be discharged laterally from the industrial truck.

16. For use with an industrial truck having a mast and a vertical load supporting carriage movable therealong, the combination of a substantially horizontal load supporting frame secured to and extending forwardly from the load supporting carriage, conveyor means extending transversely of the industrial truck and mounted to said load supporting frame for supporting a load thereon, a vertical forwardly projecting pusher member overlying said conveyor means, means carried by said load supporting carriage for guiding the rear vertical edge of said pusher member during movement over said conveyor means transversely of the industrial truck between two termini one at each side of the load supporting carriage beyond the extremity thereof, and means for effecting movement of said pusher member whereby a load supported on said conveyor means may be discharged laterally from the industrial truck.

(References on following page)

References Cited in the file of this patent

UNITED STATES PATENTS

| | | | |
|---|---|---|---|
| D. 162,853 | Lull | Apr. 10, 1951 |
| 940,878 | Jones et al. | Nov. 23, 1909 |
| 1,451,773 | Hescock | Apr. 17, 1923 |
| 1,964,621 | Creasy et al. | June 26, 1934 |
| 2,081,178 | Kullerstrand | May 25, 1937 |
| 2,086,160 | Gotthardt et al. | July 6, 1937 |
| 2,388,458 | Alfonte | Nov. 6, 1945 |
| 2,516,686 | Druschel | July 25, 1950 |
| 2,571,550 | Ehmann | Oct. 16, 1951 |
| 2,584,240 | Stewart | Feb. 5, 1952 |
| 2,599,052 | Forman | June 3, 1952 |